(12) United States Patent
Chan

(10) Patent No.: US 9,030,038 B2
(45) Date of Patent: May 12, 2015

(54) TETHERED AIRBORNE WIND POWER GENERATOR SYSTEM

(71) Applicant: Kwok Fai Chan, Hong Kong (HK)

(72) Inventor: Kwok Fai Chan, Hong Kong (HK)

( * ) Notice: Subject to any disclaimer, the term of this patent is extended or adjusted under 35 U.S.C. 154(b) by 173 days.

(21) Appl. No.: 13/729,049

(22) Filed: Dec. 28, 2012

(65) Prior Publication Data

US 2014/0062094 A1    Mar. 6, 2014

(30) Foreign Application Priority Data

Sep. 5, 2012  (CN) .......................... 2012 1 0325338

(51) Int. Cl.
*F03D 9/00*    (2006.01)
(52) U.S. Cl.
CPC ........... *F03D 9/002* (2013.01); *F05B 2240/921* (2013.01); *F05B 2240/922* (2013.01); *Y02E 10/725* (2013.01)
(58) Field of Classification Search
CPC .... Y02E 10/723; Y02E 10/725; Y02E 10/728
USPC .......... 290/44, 55; 244/24, 25, 30, 33, 153 R, 244/153 A, 138 R, 900–902
See application file for complete search history.

(56) References Cited

U.S. PATENT DOCUMENTS

| 4,084,102 | A | * | 4/1978 | Fry et al. ........................ 290/55 |
| 4,166,596 | A | * | 9/1979 | Mouton et al. .................. 244/30 |
| 4,207,026 | A | * | 6/1980 | Kushto ............................ 416/84 |
| 4,350,897 | A | * | 9/1982 | Benoit ............................. 290/55 |
| 4,634,080 | A | * | 1/1987 | McNally ......................... 244/13 |
| 5,435,259 | A | * | 7/1995 | Labrador ................... 114/39.31 |
| 2008/0048453 | A1 | * | 2/2008 | Amick ............................. 290/44 |
| 2010/0032963 | A1 | * | 2/2010 | Ferguson ........................ 290/55 |
| 2010/0314886 | A1 | * | 12/2010 | Potter ............................. 290/55 |
| 2011/0127775 | A1 | * | 6/2011 | Bevirt ............................. 290/55 |
| 2012/0043108 | A1 | * | 2/2012 | Blumer et al. ................ 174/107 |
| 2013/0207397 | A1 | * | 8/2013 | Bosman et al. ................ 290/53 |

OTHER PUBLICATIONS

International Search Report of PCT/CN2013/070032.

* cited by examiner

*Primary Examiner* — Pedro J Cuevas
*Assistant Examiner* — Sean Gugger

(57) ABSTRACT

The present application is directed to a tethered airborne wind power generator system including a plurality of pilot buoyant parafoils, at least one power generator parafoil, a nacelle and its twin-blimps, and a train of windsock propellers. The plurality of pilot buoyant parafoils is inter-connected via a composite cable. The power generator parafoil with built-in wind turbines can be suspended beneath the pilot buoyant parafoils via the composite cable. The nacelle is suspended beneath the power generator parafoil via a composite cable. A train of windsock propellers can be coupled to a rear end of the nacelle. The system shall also be applicable on ground by the deployment of an array of trains of windsock propellers hung onto a steel cable grid supported by steel towers to form a wind farm for power generation. The trains of windsock propellers rotating by wind drive their respective outboard generators to generate electrical power.

17 Claims, 12 Drawing Sheets

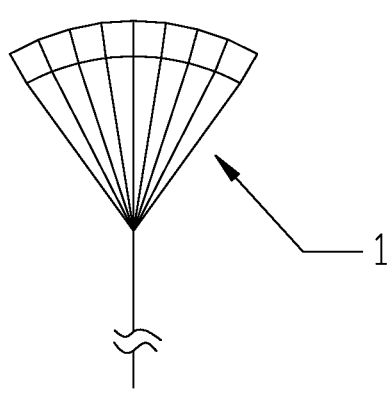
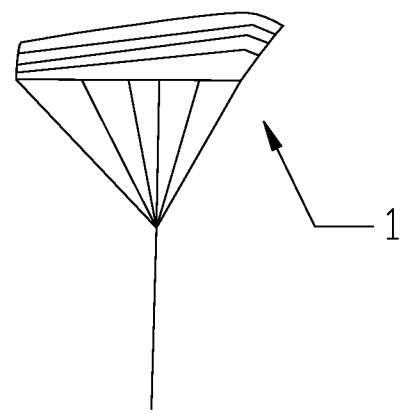
FIG. 3A
FIG. 3B
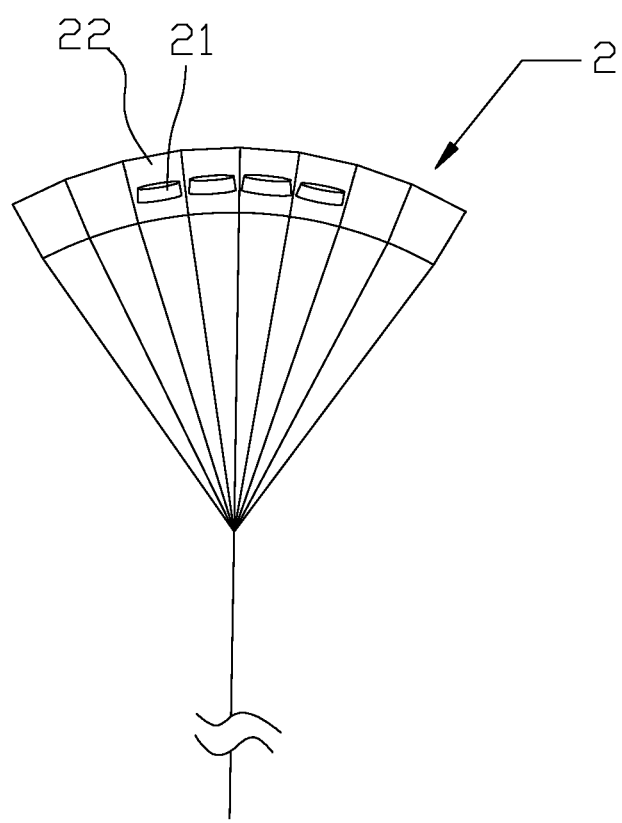
FIG. 4A

TETHERED AIRBORNE WIND POWER GENERATOR SYSTEM

CROSS-REFERENCE TO RELATED APPLICATIONS

This application claims priority of Chinese Patent Application No. 201210325338.5 filed on Sep. 5, 2012, the entire content of which is hereby incorporated by reference.

FIELD OF THE TECHNOLOGY

The present application relates to a wind power generator system, and specifically to a tethered airborne wind power generator system.

BACKGROUND

The magnitude of wind power is proportional to wind speed, height above ground and area of propeller. Therefore, the present commercial wind power generators are horizontal axis wind turbines with generators located on high towers and equipped with wide-span propellers. The recently built wind turbine in China at the Harbor of Hangzhou has a tower height of 150 meters, a propeller with blade spanning 125 meters and a total weight exceeding 400 tons. Furthermore, wind power generation is restrained in seasons, regions and power grid facilities. Off shore wind turbines would cost 20 to 30 times more if they were built on ground. In China, only 70% of wind turbines are utilized while the rest 30% are idled due to insufficient power grids for energy distribution.

Contemporary wind turbines can only work at low altitude where the wind speed is low and inconsistent. They require for the use of expensive high ratio gear boxes to step up revolution prior to coupling to expensive DC generators which are of low speed and large-diameter-rotor design in order to accommodate more winding coils and more sets of permanent magnets for optimal output. A great portion of wind energy would be lost and dissipated in this very early stage. The power generated shall be, first of all, stored in battery banks, then converted to AC power via DC-to-AC inverters, and then further processed by step-up transformers and voltage regulators prior to connection to power grids. The efficiency of wind power, with an assumption of a 10 m/sec wind speed, to AC power output may be as low as 7.2%, while its high loss in power transmission to destination further deteriorates its efficiency, thus rendering high costs for wind power generation. At high altitude, there is always consistent strong wind available for wind power generation around the year. High speed, high efficient, light weight and low cost AC generators would be used if the wind turbines could be sustained at altitude. Hence, airborne wind power generator systems have been the hot topics of research and exploitation in renewable power generation since the past couple decades.

However, existing wind power generator systems are very expensive, difficult to maintain and operate, and cannot provide steady and reliable power output. Hence, there is a strong desire to exploit for other means of wind power generator system that may be lower in costs, easier to maintain and operate, and capable of providing a more steady and reliable power output.

The above description of the background is provided to aid in understanding a wind power generator system, but is not admitted to describe or constitute pertinent prior art to the wind power generator system disclosed in the present application, or consider any cited documents as material to the patentability of the claims of the present application.

SUMMARY

According to one aspect, there is provided a tethered airborne wind power generator system including a plurality of pilot buoyant parafoils interconnected to form a train of pilot buoyant parafoils flown to altitude, a nacelle suspended in the air from the pilot buoyant parafoils by a suspension cable and provided with a power generator, and twin-blimps coupled to the two opposite sides of the nacelle via two axles respectively. The twin-blimps may be provided on their external surfaces with a plurality of vanes to catch wind energy and drive the twin-blimps to rotate, whereby the rotating torque in turn drives the power generator inside the nacelle to generate power. The tethered airborne wind power generator system may further include a plurality of windsock propellers interconnected to each other via a plurality of transmission rods to form a train of windsock propellers. One end of the train of windsock propellers can be coupled to a rear end of the nacelle via an additional transmission rod whereas the other end can be free to move. The train of windsock propellers can be caused to rotate by wind, whereby the rotating torque can be transmitted via the additional transmission rod to the power generator inside the nacelle for power generation. The train of pilot buoyant parafoils can provide buoyancy to sustain the system in the air. The train of windsock propellers can serve as a wind direction tail to maintain the nacelle and the twin-blimps in line with the wind direction.

In one embodiment, the tethered airborne wind power generator system further includes a composite cable made of synthetic fibrous material embedded with strands of copper conductors for transmission of electricity from the nacelle to a ground station. The composite cable can act as a mooring line for tethering the system to a cable winch mounted on a trolley on the ground.

In another embodiment, the tethered airborne wind power generator system further includes a composite cable made of synthetic fibrous material embedded with strands of copper conductors for transmission of electricity from the nacelle. The composite cable can act as a mooring line for tethering the system to a cable winch mounted on a platform floating on water.

In one embodiment, the tethered airborne wind power generator system may further include at least one power generator parafoil suspended in the air from the train of pilot buoyant parafoils by the suspension cable. The power generator parafoil may be provided with at least one built-in wind turbine for power generation. The power generator parafoil may include a front opening, a plurality of bottom openings, and a plurality of built-in wind turbines positioned above the plurality of bottom opening respectively, whereby wind can be drawn into the power generator parafoil through the front opening and discharged through the bottom openings thereby driving the built-in wind turbines to generate power.

In one embodiment, the two axles between the nacelle and the twin-blimps can be extendable so as to correct the differential torque developed by the twin-blimps.

In one embodiment, each windsock propeller may include a sleeve with a wide front opening and a narrow rear opening, a plurality of slanting vanes on both the external and internal surfaces of the sleeve, a frame for supporting the sleeve and a central axle mounted on the frame, whereby the slanting vanes can catch wind energy and drive the windsock propellers to rotate about the central axles, thus in turn drive the generator inside the nacelle to generate power.

In one embodiment, the nacelle may be provided with a wireless power transmitter, whereby electricity generated by the power generator inside the nacelle can be transmitted to a ground-based wireless power receiver station.

In one embodiment, the twin-blimps may be inflated with air. Each blimp may be equipped with an automatic air pump to maintain the volume of the twin-blimps.

The pilot buoyant parafoil, the power generator parafoil, the twin-blimps and the windsock propellers may be made of nylon fabrics, and their frameworks may be made of a carbon fibrous material.

According to another aspect, there is provided a tethered airborne wind power generator system including a nacelle having a power generator provided therein, two helium-filled blimps, and a plurality of windsock propellers. The two helium-filled blimps may be coupled to the two opposite sides of the nacelle via two extendable axles respectively. The helium-filled blimps may be provided on their external surfaces with a plurality of vanes to catch wind energy and drive the helium-filled blimps to rotate, whereby the rotating torque in turn drives the power generator inside the nacelle to generate power. The plurality of windsock propellers can be interconnected via a plurality of transmission rods to form a train of windsock propellers. One end of the train of windsock propellers can be coupled to a rear end of the nacelle via an additional transmission rod whereas the other end can be free to move. The train of windsock propellers can be caused to rotate by wind, whereby the rotating torque is transmitted via the additional transmission rod to the power generator inside the nacelle for power generation. The helium-filled blimps can provide buoyancy to sustain aloft the system in the air.

In one embodiment, each windsock propeller may include a sleeve with a wide front opening and a narrow rear opening, a plurality of slanting vanes provided on both the external and internal surfaces of the sleeve, a frame for supporting the sleeve and a central axle mounted on the frame, whereby the slanting vanes can catch wind energy and drive the windsock propellers to rotate about the central axles, thus in turn drive the generator inside the nacelle to generate power.

According to yet another aspect there is provided a tethered airborne wind power generator system including a plurality of pilot buoyant parafoils interconnected to form a train of pilot buoyant parafoils flown to altitude, and at least one power generator parafoil suspended in the air from the train of pilot buoyant parafoils by a suspension cable. The power generator parafoil may be provided with a plurality of built-in wind turbines to generate power. The train of pilot buoyant parafoils can provide buoyancy to sustain the system in the air.

In one embodiment, the power generator parafoil may include a front opening, a plurality of bottom openings, and a plurality of built-in wind turbines positioned above the plurality of bottom opening respectively, whereby wind can be drawn into the power generator parafoil through the front opening and discharged through the bottom openings thereby driving the built-in wind turbines to generate power.

In one embodiment, the tethered airborne wind power generator system may further include a composite cable made of synthetic fibrous material embedded with strands of copper conductors for transmission of electricity from the power generator parafoil to a ground station. The composite cable can act as a mooring line for tethering the system to a cable winch mounted on a trolley on the ground or a platform floating on water.

According to a further aspect, there is provided a ground-based airborne wind power generator system including a steel cable grid supported by a plurality of steel towers, a plurality of windsock propellers and an electrical cable grid. The plurality of windsock propellers may be interconnected to each other via a plurality of transmission rods to form a train of windsock propellers. One end of the train of windsock propellers can be coupled to an outboard generator hung onto the steel cable grid via an additional transmission rod whereas the other end of the train of windsock propeller can be free to move. The train of windsock propellers can be caused to rotate by wind thereby driving the outboard generator to generate electrical power. The electrical cable grid may run along with the steel cable grid for distribution of electricity generated by the outboard generator.

In one embodiment, the ground-based airborne wind power generator system may include an array of the train of windsock propellers to form a wind farm for wind power generation. The power generated from each outboard generator can be fed individually via the electrical cable grid to a central processing unit prior to connection to overhead power grid for power transmission.

In one embodiment, each windsock propeller may include a sleeve with a wide front opening and a narrow rear opening, a plurality of slanting vanes provided on both the external and internal surfaces of the sleeve, a frame for supporting the sleeve and a central axle mounted on the frame, whereby the slanting vanes can catch wind energy and drive the windsock propellers to rotate about the central axles, thus in turn drive the generator inside the nacelle to generate power.

Although the wind power generator system disclosed in the present application is shown and described with respect to certain embodiments, it is obvious that equivalents and modifications will occur to others skilled in the art upon the reading and understanding of the specification. The present application includes all such equivalents and modifications, and is limited only by the scope of the claims.

BRIEF DESCRIPTION OF THE DRAWINGS

Specific embodiments of the wind power generator system disclosed in the present application will now be described by way of example with reference to the accompanying drawings wherein:

FIG. 3a is a front view of a buoyant parafoil in the first embodiment of the tethered airborne wind power generator system of the present application;

FIG. 3b is a side view of the buoyant parafoil in the first embodiment of the tethered airborne wind power generator system of the present application;

FIG. 4a is a front illustrative view of a power generator parafoil in the first embodiment of the tethered airborne wind power generator system of the present application;

DETAILED DESCRIPTION

Reference will now be made in detail to a preferred embodiment of the wind power generator system disclosed in the present application, examples of which are also provided in the following description. Exemplary embodiments of the wind power generator system disclosed in the present application are described in detail, although it will be apparent to those skilled in the relevant art that some features that are not particularly important to an understanding of the wind power generator system may not be shown for the sake of clarity.

Furthermore, it should be understood that the wind power generator system disclosed in the present application is not limited to the precise embodiments described below and that various changes and modifications thereof may be effected by one skilled in the art without departing from the spirit or scope of the appended claims. For example, elements and/or features of different illustrative embodiments may be combined with each other and/or substituted for each other within the scope of this disclosure and appended claims.

Figure 1:
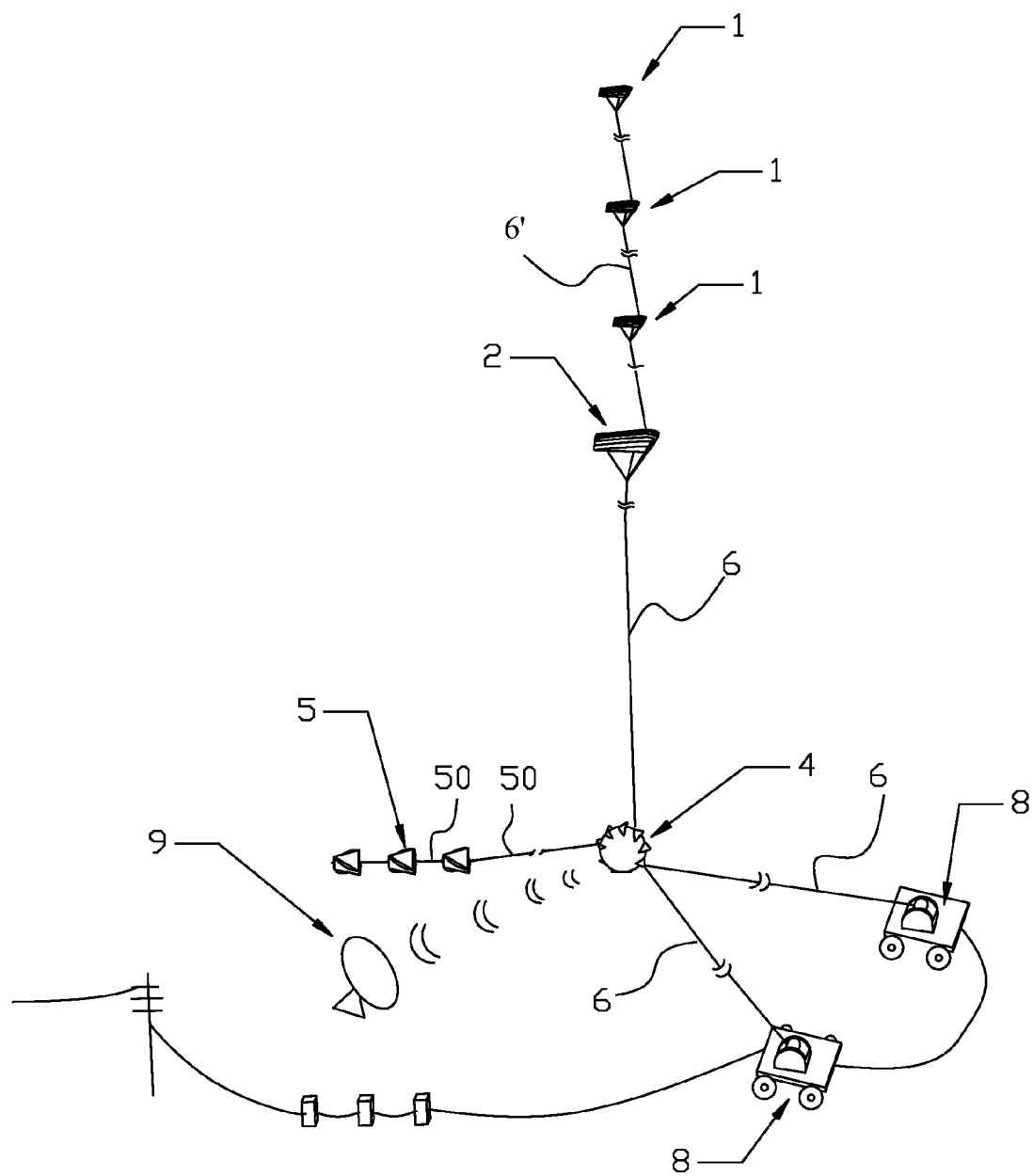
FIG. 1 is a schematic view of a first embodiment of a tethered airborne wind power generator system of the present application.
Figure 2:
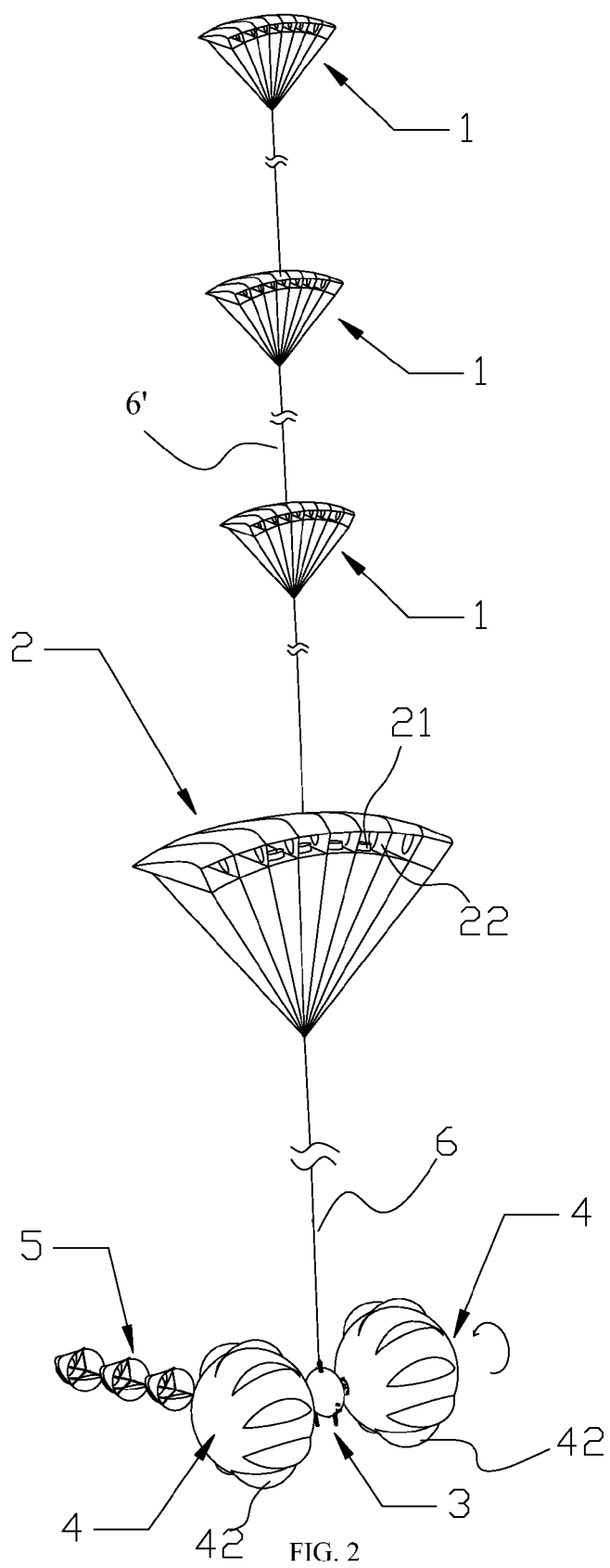
FIG. 2 is an illustrative view of parts of the first embodiment of the tethered airborne wind powered generator system of the present application.

FIG. 1 shows a schematic view of a first embodiment of a tethered airborne wind power generator system of the present application. The tethered airborne wind power generator system may include a train of pilot buoyant parafoils formed by a plurality of pilot buoyant parafoils 1, at least one power generator parafoil 2, a nacelle 3 with its twin-blimps 4, and a train of windsock propellers 5, composite cables 6, cable winches 8, a ground-based wireless power receiver station 9, and a cable grid 10 for power transmission.

Referring to FIGS. 1, 2, 3a and 3b, in the present embodiment, the train of pilot buoyant parafoils may be formed by a plurality of buoyant parafoils 1 interconnected via a suspension cable 6' to provide buoyancy to sustain the wind power generator system aloft. The buoyant parafoil 1 may have a curved upper surface and a flat lower surface similar to a wing of an airplane, which can generate buoyancy when heading against a stream of rapidly flowing air. The train of buoyant parafoils 1 can generate buoyancy to sustain aloft the power generator parafoil 2, the nacelle 3, the twin-blimps 4, the windsock propeller 5, and the composite cables 6 in the air. The composite cables 6 may be made of a synthetic fibrous material, or any other suitable material, embedded with strands of copper conductors for light weight, extra strength and electrical power transmission.

Referring to FIGS. 1, 2, 4a and 4c, in the present embodiment, the power generator parafoil 2 can be suspended in the air from the train of pilot buoyant parafoils by the suspension cable 6'. There may be a plurality of built-in wind turbines 21 provided in the interior of the power generator parafoil 2 and positioned above a plurality of bottom openings respectively. When strong wind is being drawn into the power generator parafoil 2 through a wide front opening 22, it can drive the wind turbines 21 to generate power in the course of its travel prior to discharge to outside from the plurality of bottom openings 23. When wind is being discharged through the bottom openings 23 from the power generator parafoil 2, a buoyant force will be developed which can help to sustain the power generator parafoil 2 aloft. It is appreciated that the size of the power generator parafoil 2 may be larger than one pilot buoyant parafoil 1 in order to accommodate the built-in wind turbines 21.

Referring to FIGS. 1, 2, 5a and 5b, in the present embodiment, the nacelle 3 can be suspended in the air from the power generator parafoil 2 by the composite cable 6. The twin-blimps 4 can be rotatably coupled to two opposite sides of the nacelle 3 respectively. There may be a plurality of vanes 42 provided on the surface of the twin-blimps 4 to catch the wind energy. As wind is passing through, the twin-blimps 4 can rotate about a horizontal axis and deliver the torque to a power generator provided inside the nacelle 3 via two extendable axles 41 for power generation. The twin-blimps 4 may be inflated with air. Each blimp 4 can be equipped with an automatic air pump to maintain the blimp volume at all times. As the twin-blimps 4 rotate, a buoyant force can be developed which can help to assist the twin-blimps 4 to sustain aloft. It is understood that adjustment to the volume of the twin-blimps 4 and the length of the extendable axles 41 can correct the differential torque developed by the twin-blimps 4 so as to enable them to stay in line with the wind direction.

Referring to FIGS. 1, 2, 5b, 6a and 6d, in the present embodiment, a train of windsock propellers 5 can be coupled to a rear end of the nacelle 3 via a transmission rod 50. The train of windsock propellers 5 may be formed by interconnecting a plurality of windsock propellers via carbon fibrous transmission rods 50. Each windsock propeller 5 may include a sleeve 51 having a wide front opening and a narrow rear opening. There may be pairs of symmetrical slanting vanes 53 provided on both the external and internal surfaces of the sleeve 51. Each windsock propeller 5 may also include a frame for supporting the sleeve 51 and a central axle connected to the frame. As wind is passing through the train of windsock propellers 5, the vanes 53 can catch the wind energy and generate torque to rotate the windsock propellers 5 about the central axles, which can in turn drive the generator inside the nacelle 3 for power generation. In addition to power generating, the train of windsock propellers 5 can also act as a wind direction tail to maintain the nacelle 3 and its twin-blimps 4 in line with the wind direction at all times. Each windsock propeller 5 may be made of nylon fabrics, or another other suitable material, and a carbon fibrous skeleton.

Figure 7:
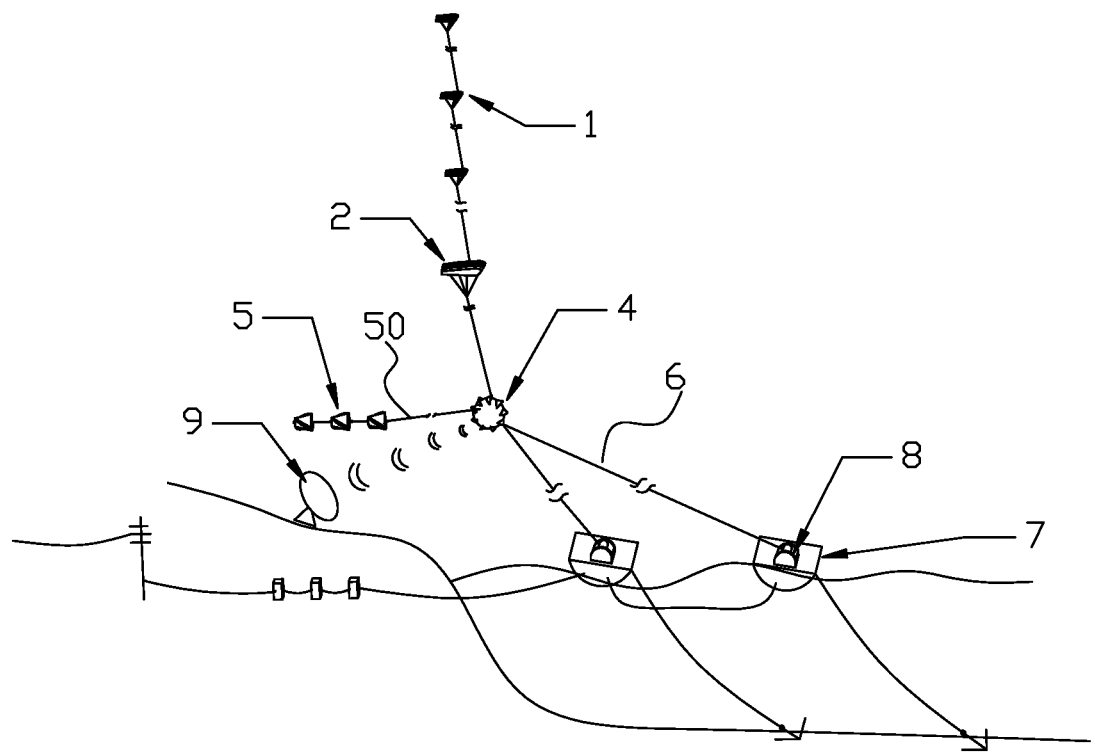
FIG. 7 is a schematic view of a fourth embodiment of the tethered airborne wind power generator system of the present application.

Referring to FIG. 1, in the present embodiment, the tethered airborne power generator system can be tethered in the air via composite cables 6 acting as mooring lines and running from the nacelle 3 to the ground-based cable winches 8 mounted on trolleys and/or cable winches 8 mounted on platforms 7 floating on water, as illustrated in FIG. 7. The composite cables 6 running from the nacelle 3 to the ground may be made of extra high strength synthetic fibrous materials with embedded strands of copper conductors for control and power transmission. The power generated by the power generator parafoil 2 and the nacelle 3 can be fed to the ground via the composite cables 6 and/or via wireless power transmission from a wireless power transmitter provided on the nacelle 3 to the ground-based wireless power receiver station 9 in the future when technology permits.

In the tethered airborne wind power generator system of the present application, the pilot buoyant parafoils 1, the power generator parafoil 2, the nacelle 3, the twin-blimps 4, and the train of windsock propellers 5 may be made of durable nylon fabrics or any other suitable material, and their frameworks may be made of a carbon fibrous material or any other suitable material.

The tethered airborne wind power generator system of the present application does not require high mast towers for the positioning of the nacelles and wide-span propellers. The tethered airborne wind power generator system of the present application can simply use a train of pilot buoyant parafoils 1 flown to high altitude for buoyancy in order to sustain the wind power generator system aloft for a long period of time till maintenance. Therefore, the tethered airborne wind power generator system of the present application is easier to operate and maintain.

The tethered airborne wind power generator system of the present application can also resolve the dead-knot technical problem—the requirement of frequent replenishment of helium due to its escape from the blimps as encountered by the helium-filled airborne wind turbine systems.

For power generation, the tethered airborne wind power generator system of the present application can only utilize wind energy. It may not require helium-filled blimps, complicated mechanism, or any other external energy for buoyancy. Its operation and maintenance costs can be minimal and the system may become one of the world's lowest costs of power generation in the future.

In the tethered airborne wind power generator system of the present application, the twin-blimps 4 can be inflated with air and equipped with automatic air pumps. Air is likely less prone to escape from the blimps and the automatic air pumps can maintain a correct volume of blimps at all times for efficient wind power generation. It is however appreciated that the twin-blimps 4 may still be inflated with helium as an option.

The tethered airborne wind power generator system of the present application may use a train of windsock propellers 5 as a wind direction tail to ensure that the nacelle 3 and its twin-blimps 4 can stay in line with the wind direction at all times. In addition, the rotating torque delivered to the power generator inside the nacelle 3 via the transmission rod 50 from the train of windsock propellers 5 can also generate power for more efficient output.

The tethered airborne wind power generator system of the present application can operate at a much higher altitude thousands of meters above the ground than the known airborne wind turbine systems. At high altitude, wind speed is always strong and steady around the year. Therefore, the tethered airborne wind power generator system of the present application can provide a steady, reliable and efficient wind power output at all times.

Furthermore, the tethered airborne wind power generator system of the present application can require less mooring lines on ground for positioning the system in the air.

FIG. 7 is a schematic view of another embodiment of the tethered airborne wind power generator system of the present application. The tethered airborne wind power generator system of this embodiment may also include the train of pilot buoyant parafoils formed by the plurality of buoyant parafoils 1 interconnected to each other, the power generator parafoil 2, the nacelle 3, the twin-blimps 4, and the train of windsock propellers formed by the plurality of windsock propellers 5, and the composite cable 60 for power delivery. Its difference from the first embodiment is that the tethered airborne wind power generator system of this embodiment can work on water surface. The electricity generated in nacelle 3 can be fed to the ground via the composite cables 6 connected to the cable winches 8 mounted on platforms 7 floating on water, or via wireless power transmission to the ground wireless power receiver station 9 when technology permits in the future.

The structures of the pilot buoyant parafoils 1, power generator parafoil 2, nacelle 3, twin-blimps 4 and windsock propellers 5 in this embodiment can be the same as those mentioned in the first embodiment, which shall not be reiterated.

Figure 8:
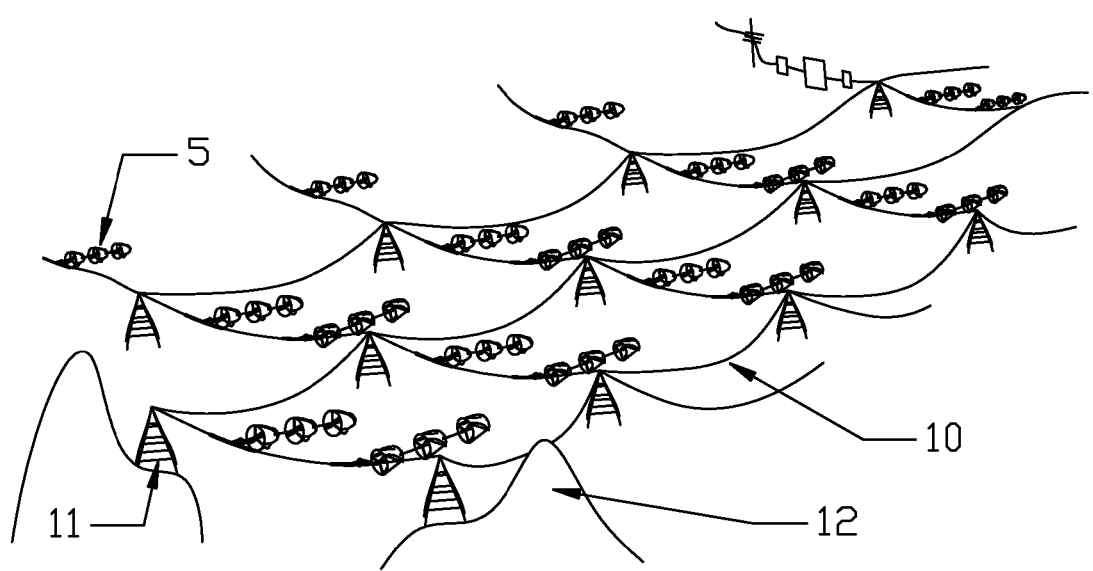
FIG. 8 is a schematic view of a fifth embodiment of the tethered airborne wind power generator system of the present application.
Figure 9A:
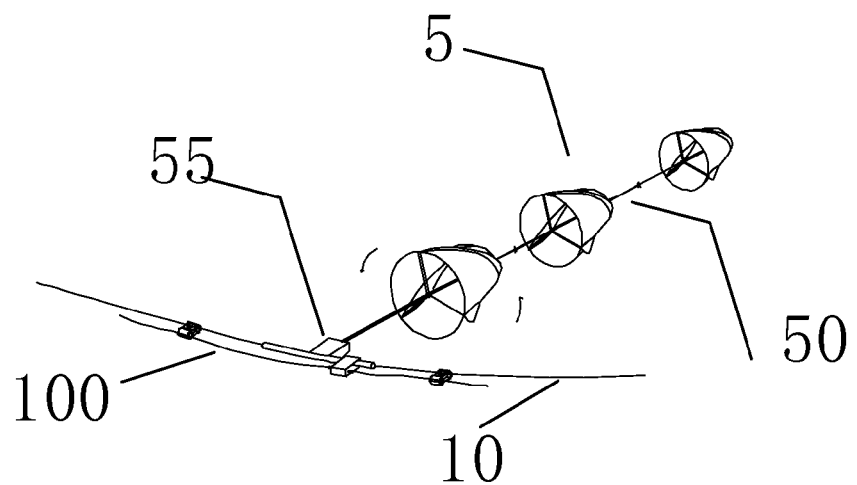
FIG. 9a is a perspective view of a train of windsock propellers of the fifth embodiment of the tethered airborne wind power generator system of the present application.
Figure 9B:
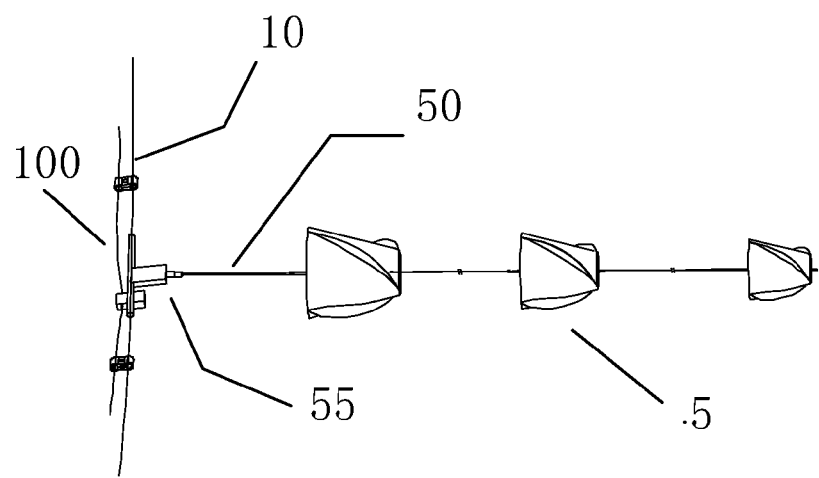
FIG. 9b is a side view of the train of windsock propellers of the fifth embodiment of the tethered airborne wind power generator system of the present application.

FIGS. 8, 9a and 9b are illustrative views of a further embodiment of the airborne wind power generator system of the present application. It is directed to another ground based airborne wind power generator system. It may include an array of trains of windsock propellers 5 hung onto a steel cable grid 10 supported by steel towers 11 erected on hilly region, grass plain, desert or at any convenient site. Each train of windsock propellers 5 may be formed by a plurality of windsock propellers interconnected to each other via transmission rods 50. One end of the train of windsock propellers may be coupled to an outboard generator 55 hung onto the steel cable grid 10 whereas the other end can be free to move. As wind is passing through, the train of windsock propellers 5 can rotate and drive the generator 55 to operate. The power generated by each train of windsock propellers can be fed via electrical cable grid 100, as depicted in FIG. 9b, to a central processing unit of this ground-based wind power generator system prior to connection to the overhead power transmission grid. In this embodiment, the trains of windsock propellers 5 can be the only prime mechanism for power generation.

With reference to FIGS. 4d, 5a, 5b, 5c, 5d, other embodiments of the tethered airborne wind power generator system of the present application may have the following configurations.

Figure 4B:
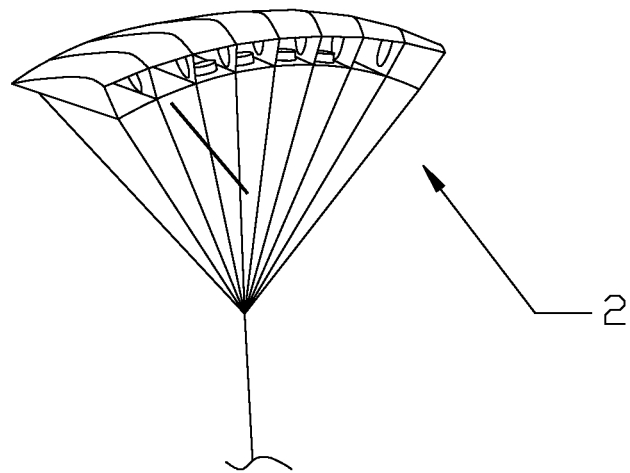
FIG. 4b is a perspective view of the power generator parafoil in the first embodiment of the tethered airborne wind power generator system of the present application.
Figure 4C:
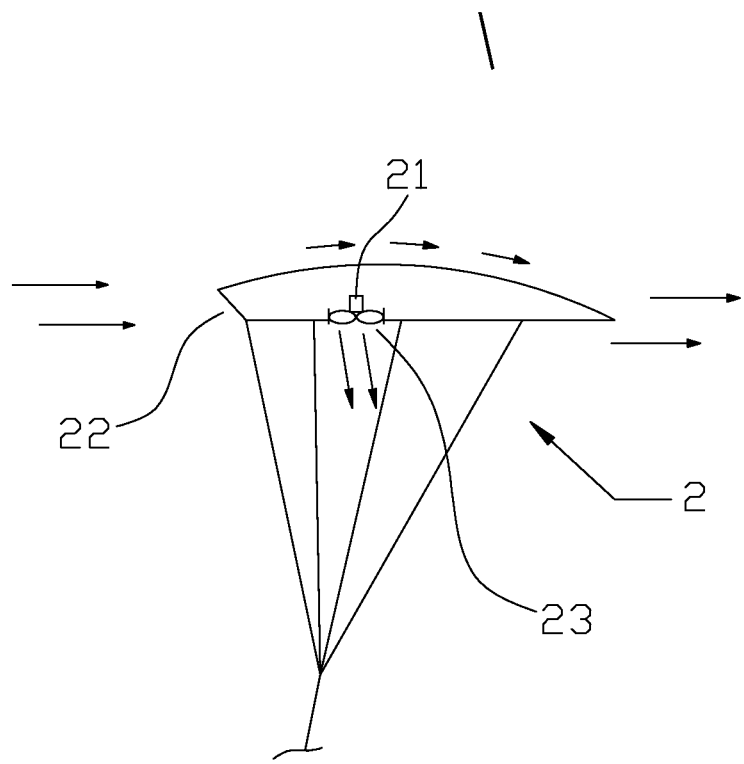
FIG. 4c is an illustrative view of a working power generator parafoil in the first embodiment of the tethered airborne wind power generator system of the present application.
Figure 4D:
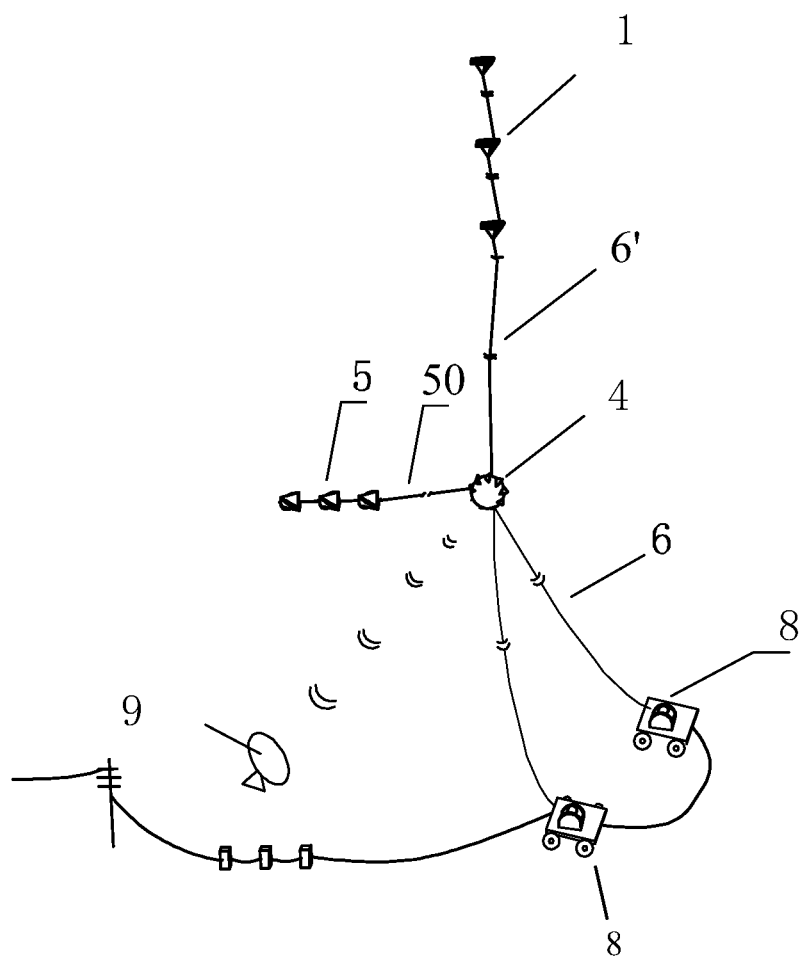
FIG. 4d is a schematic view of a second embodiment of the tethered airborne wind power generator system of the present application.

The tethered airborne wind power generator system, as shown in FIG. 4d, can only make use of the buoyancy from a train of pilot buoyant parafoils 1 to sustain the nacelle 3 and its twin-blimps 4, and the train of windsock propellers 5 aloft to altitude.

The working principles for wind power generation can be the same as aforesaid in the previous embodiment, which shall not be reiterated herein.

Figure 5A:
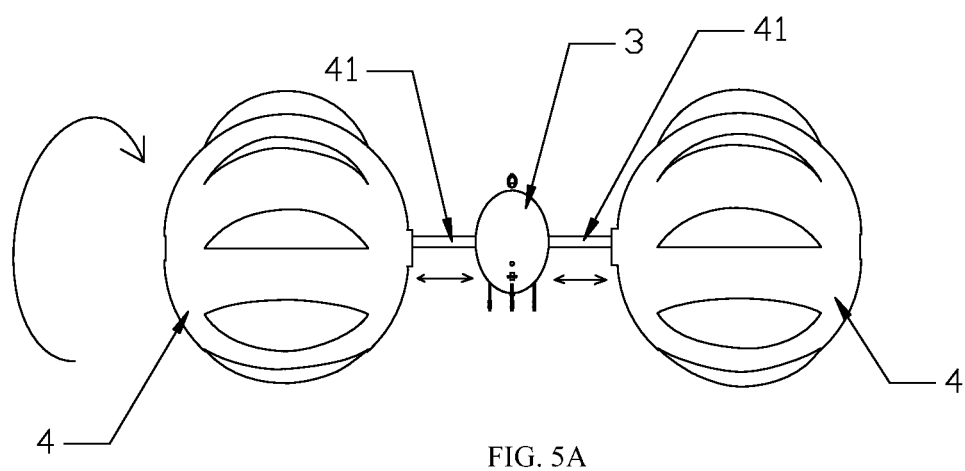
FIG. 5a is a front view of a working twin-blimps power generator device of the tethered airborne wind power generator system of the present application.
Figure 5B:
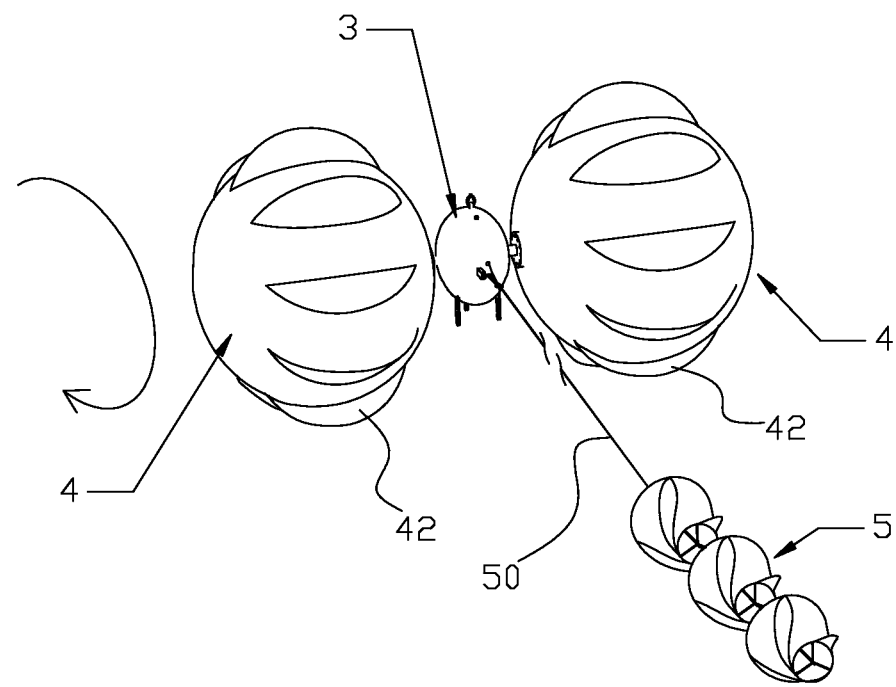
FIG. 5b is a rear perspective of the twin-blimps power generator device of the tethered airborne wind power generator system with the coupling of a train of windsock propellers at the rear of a nacelle.
Figure 5C:
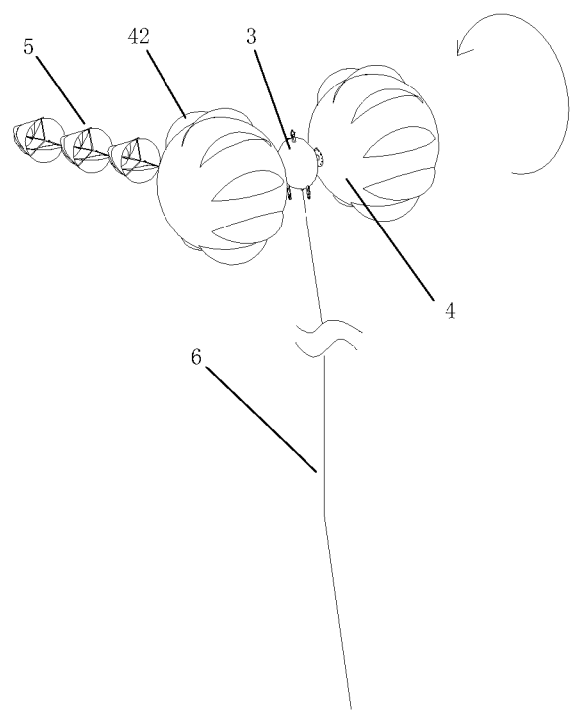
FIG. 5c is a front perspective of the twin-blimps power generator device of the tethered airborne wind power generator system with the coupling of a train of windsock propellers at the rear of a nacelle.
Figure 5D:
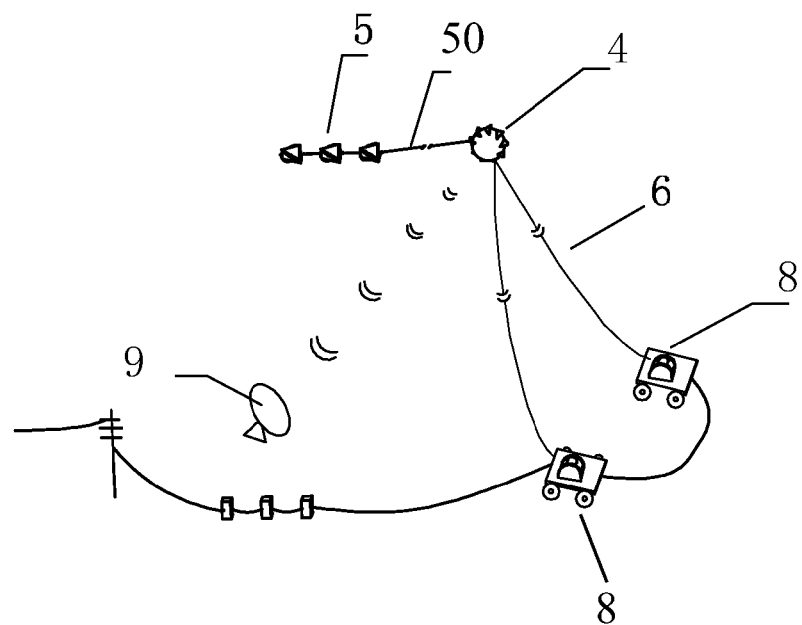
FIG. 5d is a schematic view of a third embodiment of the tethered airborne wind power generator system of the present application.
Figure 6A:
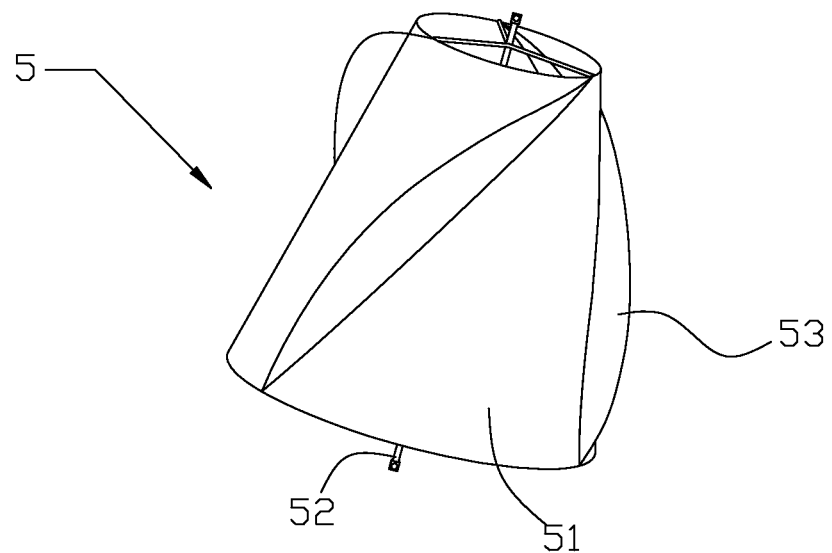
FIG. 6a is a first perspective of a windsock propeller of the tethered airborne wind power generator system of the present application.
Figure 6B:
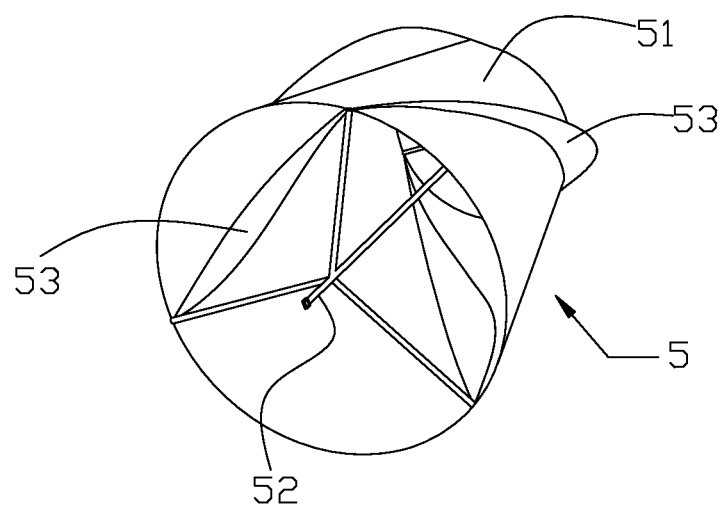
FIG. 6b is a second perspective of the windsock propeller of the tethered airborne wind power generator system of the present application.
Figure 6C:
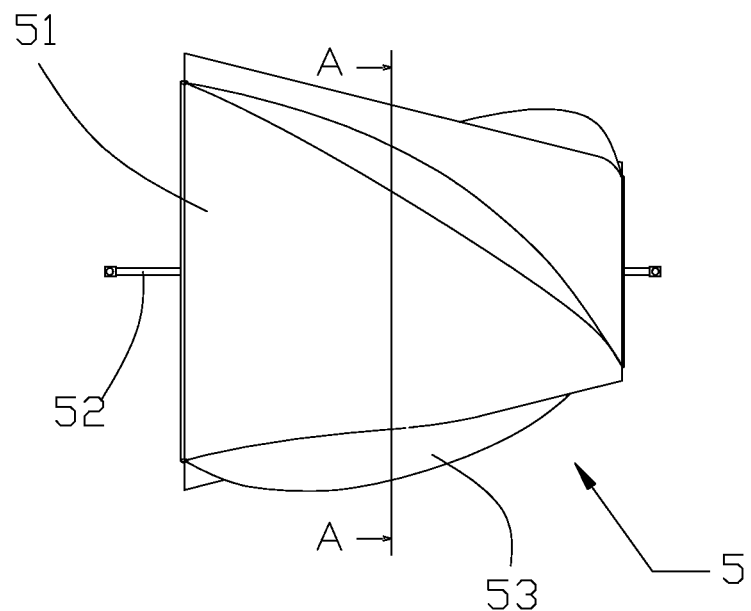
FIG. 6c is a side view of the windsock propeller of the tethered airborne wind power generator system of the present application.
Figure 6D:
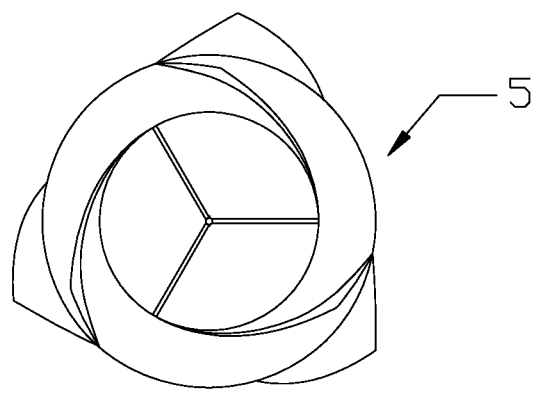
FIG. 6d is an A-A cross-sectional view of FIG. 6c.

The tethered airborne wind power generator system, as shown in FIG. 5d, can only make use of the buoyancy from helium-filled blimps to sustain the nacelle 3 and its twin-blimps 4, and the train of windsock propellers 5 aloft to altitude as an option to the buoyancy provided by the train of pilot buoyant parafoils 1. The working principles for wind power generation can be the same as aforesaid in the previous embodiment, which shall not be reiterated herein.

While the wind power generator system disclosed in the present application has been shown and described with particular references to a number of preferred embodiments thereof, it should be noted that various other changes or modifications may be made without departing from the scope of the appending claims.

What is claimed is:

1. A tethered airborne wind power generator system comprising:
   (a) a plurality of pilot buoyant parafoils interconnected to form a train of pilot buoyant parafoils flown to altitude;
   (b) a nacelle suspended in the air from the pilot buoyant parafoils by a suspension cable, the nacelle being provided therein with a power generator;
   (c) twin-blimps rotatably coupled to the two opposite sides of the nacelle via two axles respectively, the twin-blimps being provided on their external surfaces with a plurality of vanes to catch wind energy and drive the twin-blimps to rotate, whereby the rotating torque in turn drives the power generator inside the nacelle to generate power; and
   (d) a plurality of windsock propellers interconnected to each other via a plurality of transmission rods to form a train of windsock propellers, one end of the train of windsock propellers being coupled to a rear end of the nacelle via an additional transmission rod whereas the other end being free to move, the train of windsock propellers being caused to rotate by wind, whereby the rotating torque is transmitted via the additional transmission rod to the power generator inside the nacelle for power generation;
   (e) wherein the train of pilot buoyant parafoils provides buoyancy to sustain the system in the air.

2. The tethered airborne wind power generator system according to claim 1, further comprising a composite cable made of synthetic fibrous material embedded with strands of copper conductors for transmission of electricity from the nacelle to a ground station, and the composite cable acting as a mooring line for tethering the system to a cable winch mounted on a trolley on the ground.

3. The tethered airborne wind power generator system according to claim 1, further comprising a composite cable made of synthetic fibrous material embedded with strands of copper conductors for transmission of electricity from the nacelle, and the composite cable acting as a mooring line for tethering the system to a cable winch mounted on a platform floating on water.

4. The tethered airborne wind power generator system according to claim 1, further comprising at least one power generator parafoil suspended in the air from the train of pilot buoyant parafoils by the suspension cable, the power generator parafoil being provided with at least one built-in wind turbine for power generation.

5. The tethered airborne wind power generator system according to claim 4, wherein the power generator parafoil comprises a front opening, a plurality of bottom openings, and a plurality of built-in wind turbines positioned above the plurality of bottom opening respectively, whereby wind is drawn into the power generator parafoil through the front opening and discharged through the bottom openings thereby driving the built-in wind turbines to generate power.

6. The tethered airborne wind power generator system according to claim 1, wherein the two axles between the nacelle and the twin-blimps are extendable so as to correct the differential torque developed by the twin-blimps.

7. The tethered airborne wind power generator system according to claim 1, wherein each windsock propeller includes a sleeve with a wide front opening and a narrow rear opening, a plurality of slanting vanes on both the external and internal surfaces of the sleeve, a frame for supporting the sleeve and a central axle mounted on the frame, whereby the slanting vanes catch wind energy and drive the windsock propellers to rotate about the central axles, thus in turn drive the generator inside the nacelle to generate power.

8. The tethered airborne wind power generator system according to claim 1, wherein the train of windsock propellers serves as a wind direction tail to maintain the nacelle and the twin-blimps in line with the wind direction.

9. The tethered airborne wind power generator system according to claim 1, wherein the nacelle is provided with a wireless power transmitter, whereby electricity generated by the power generator inside the nacelle can be transmitted to a ground-based wireless power receiver station.

10. The tethered airborne wind power generator system according to claim 1, wherein the twin-blimps are inflated with air.

11. The tethered airborne wind power generator system according to claim 1, wherein each blimp is equipped with an automatic air pump to maintain the volume of the twin-blimps.

12. The tethered airborne wind power generator system according to claim 4, wherein the pilot buoyant parafoil, the power generator parafoil, the twin-blimps and the windsock propellers are made of nylon fabrics and their frameworks are made of carbon fibrous material.

13. A tethered airborne wind power generator system comprising:
   (a) a nacelle having a power generator provided therein;
   (b) two helium-filled blimps rotatably coupled to the two opposite sides of the nacelle via two extendable axles respectively, the helium-filled blimps being provided on their external surfaces with a plurality of vanes to catch wind energy and drive the helium-filled blimps to rotate, whereby the rotating torque in turn drives the power generator inside the nacelle to generate power; and
   (c) a plurality of windsock propellers interconnected via a plurality of transmission rods to form a train of windsock propellers, one end of the train of windsock propellers being coupled to a rear end of the nacelle via an additional transmission rod whereas the other end being free to move, the train of windsock propellers being caused to rotate by wind, whereby the rotating torque is transmitted via the additional transmission rod to the power generator inside the nacelle for power generation;
   (d) wherein the helium-filled blimps provide buoyancy to sustain aloft the system in the air.

14. The tethered airborne wind power generator system according to claim 13, wherein each windsock propeller includes a sleeve with a wide front opening and a narrow rear opening, a plurality of slanting vanes provided on both the external and internal surfaces of the sleeve, a frame for supporting the sleeve and a central axle mounted on the frame, whereby the slanting vanes catch wind energy and drive the windsock propellers to rotate about the central axles, thus in turn drive the generator inside the nacelle to generate power.

15. A ground-based airborne wind power generator system comprising:
   (a) a steel cable grid supported by a plurality of steel towers;
   (b) a plurality of windsock propellers interconnected to each other via a plurality of transmission rods to form a train of windsock propellers, one end of the train of windsock propellers being coupled to an outboard generator hung onto the steel cable grid via an additional transmission rod whereas the other end of the train of windsock propeller being free to move, the train of windsock propellers being caused to rotate by wind thereby driving the outboard generator to generate electrical power; and (c) an electrical cable grid running along with the steel cable grid for distribution of electricity generated by the outboard generators.

16. The ground-based airborne wind power generator system according to claim 15, comprising an array of the train of windsock propellers to form a wind farm for wind power generation, the power generated from each outboard generator being fed individually via the electrical cable grid to a central processing unit prior to connection to overhead power grid for power transmission.

17. The ground-based airborne wind power generator system according to claim 15, wherein each windsock propeller includes a sleeve with a wide front opening and a narrow rear opening, a plurality of slanting vanes provided on both the external and internal surfaces of the sleeve, a frame for supporting the sleeve and a central axle mounted on the frame, whereby the slanting vanes catch wind energy and drive the windsock propellers to rotate about the central axles, thus in turn drive the generator inside the nacelle to generate power.

* * * * *